United States Patent
Tenhet, Jr. et al.

(10) Patent No.: US 6,740,879 B1
(45) Date of Patent: May 25, 2004

(54) METHOD AND APPARATUS FOR AUTOMATED DETECTION AND INDICATION OF MOVEMENT

(75) Inventors: Calvin L. Tenhet, Jr., Rowlett, TX (US); Clint W. Halsted, McKinney, TX (US); Hector M. Reyes, Jr., Richardson, TX (US)

(73) Assignee: Raytheon Company, Waltham, MA (US)

( * ) Notice: Subject to any disclaimer, the term of this patent is extended or adjusted under 35 U.S.C. 154(b) by 186 days.

(21) Appl. No.: 10/140,714

(22) Filed: May 7, 2002

(51) Int. Cl.$^7$ .................................................. G01J 5/021
(52) U.S. Cl. ........................................ 250/342; 250/332
(58) Field of Search ............................. 250/342, 332, 250/339.14

(56) References Cited

U.S. PATENT DOCUMENTS

| | | | | |
|---|---|---|---|---|
| 3,856,989 A | * | 12/1974 | Weimer | 348/318 |
| 4,064,533 A | * | 12/1977 | Lampe et al. | 348/25 |
| 4,675,532 A | * | 6/1987 | Carson | 348/294 |
| 4,958,077 A | * | 9/1990 | Menke | 250/347 |
| 5,014,131 A | * | 5/1991 | Reed et al. | 348/241 |
| 5,796,474 A | * | 8/1998 | Squire et al. | 356/152.1 |

OTHER PUBLICATIONS

"99–938 Moving Target Indicator and Information Fusion (AFOSR)", U.S. Air Force Office of Scientific Research, 2 pages dated Nov. 22, 1999.

Deshpande, et al., "Max–Mean and Max–Median filters for detection of small–targets", SPIE Conference on Signal and Data Processing of Small Targets, Jul., 1999, Denver, Colorado, SPIE vol. 3809; pp.74–83.

Cervini, et al. "U.S. Army TUAV Payload Development and Integration Strategy", Mar. 8, 2001, 6 pages.

"Motorola Joint Surveillance Target Attack Radar System (Joint STARS)"; Motorola Space and Systems Technology Group, Mar. 8, 2001, 4 pages.

Ritcey, eta l., "Performance of Max–Mean Level Detector With and Without Censoring"; IEEE Transactions on Aerospace and Electronic Systems; vol. AES–25, No. 2, pp. 213–223; Mar. 1989.

Jordan, et al., "Detection and Tracking of Targets Against a Cloudscene Background Using Space–Based Sensors", MIT Lincoln Laboratory, Lexington, Massachusetts, pp. 365–371, 2000.

Braunreiter, et al. "On the Use of Space–Time Adaptive Processing and Time–Frequency Data Representations for Detection of Near–Stationary Targets in Monostatic Clutter", Raytheon Missile Systems, Tucson, Arizona, pp. 472–475, 2000.

* cited by examiner

*Primary Examiner*—Albert Gagliardi
(74) *Attorney, Agent, or Firm*—Baker Botts L.L.P.

(57) ABSTRACT

An apparatus (10) includes a display (14), and includes a focal plane array (12) which can detect infrared radiation from a scene. The focal plane array outputs successive images of the scene, which are comparatively analyzed to identify movement of persons or objects within the scene. Pixels corresponding to detected movement are highlighted in an image presented on the display. A device (117) can be provided to generate an audible sound in response to detection of movement.

24 Claims, 8 Drawing Sheets

METHOD AND APPARATUS FOR AUTOMATED DETECTION AND INDICATION OF MOVEMENT

TECHNICAL FIELD OF THE INVENTION

The invention relates in general to devices which can display an image of a scene and, more particularly, to a method and apparatus for automated detection and indication of movement within an observed scene.

BACKGROUND OF THE INVENTION

There are existing devices which include a detector that produces successive images of infrared radiation emitted by a scene, and which use this information to present a series of visible images on a display. In certain applications, an operator will observe the display, for the purpose of monitoring activity of persons or objects such as vehicles within the scene. However, it is sometimes difficult for the operator to discern the presence of a person or object of interest within the scene, even when the person or object is moving. For example, where the operator has been observing the display for a fairly long period of time and is experiencing some fatigue, the operator may entirely overlook the presence of a person or object, even if the person or object is moving.

In an attempt to address this problem, pre-existing systems have been developed which attempt to automatically detect and identify movement of a person or object of interest. These systems use techniques that are known in the industry as moving target indicator (MTI) techniques. These MTI systems are intended to automatically detect and flag movement of a person or object within a scene, so that an operator is less likely to miss the person or object. Although these pre-existing MTI systems have been generally adequate for their intended purposes they have not been satisfactory in all respects.

For example, some pre-existing systems simply place a symbol or icon around a region in which movement is believed to have been detected. This leaves the operator with the task of attempting to visually discern the target within the region identified by the symbol or icon. Moreover, the pre-existing design requires the use of a substantial amount of additional hardware and software, including multiple processors, large amounts of memory, and relatively large and complex algorithms. The additional hardware involves a substantial amount of added cost, power, space and/or weight. Consequently, in many existing systems, implementation of these pre-existing MTI techniques is physically impractical and cost prohibitive. This is particularly true of existing systems which are portable and operate from battery power, where size, weight, power consumption and cost are significant design criteria. Still another problem is that, where the determination of whether there has been motion is made in an automated manner, for example by a software algorithm, false alarms can occur.

SUMMARY OF THE INVENTION

From the foregoing, it may be appreciated that a need has arisen for a method and apparatus which can efficiently and effectively detect and identify movement within an observed scene. According to the present invention, a method and apparatus are provided to address this need, and involve: responding to radiation from a scene by producing successive images of the scene, each image including a plurality of pixels which each have a respective pixel value representative of a level of radiation corresponding to that pixel; assigning each pixel in each image to one of a first class and a second class when that pixel respectively meets and fails to meet a criteria, the criteria being met when the current pixel value for the pixel differs by at least a threshold amount from a history value which is a function of the pixel value of that pixel in at least one prior image; converting each image to an adjusted image by effecting an adjustment to the pixel values of the pixels in a selected one of the first and second classes; and sequentially displaying the adjusted images.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
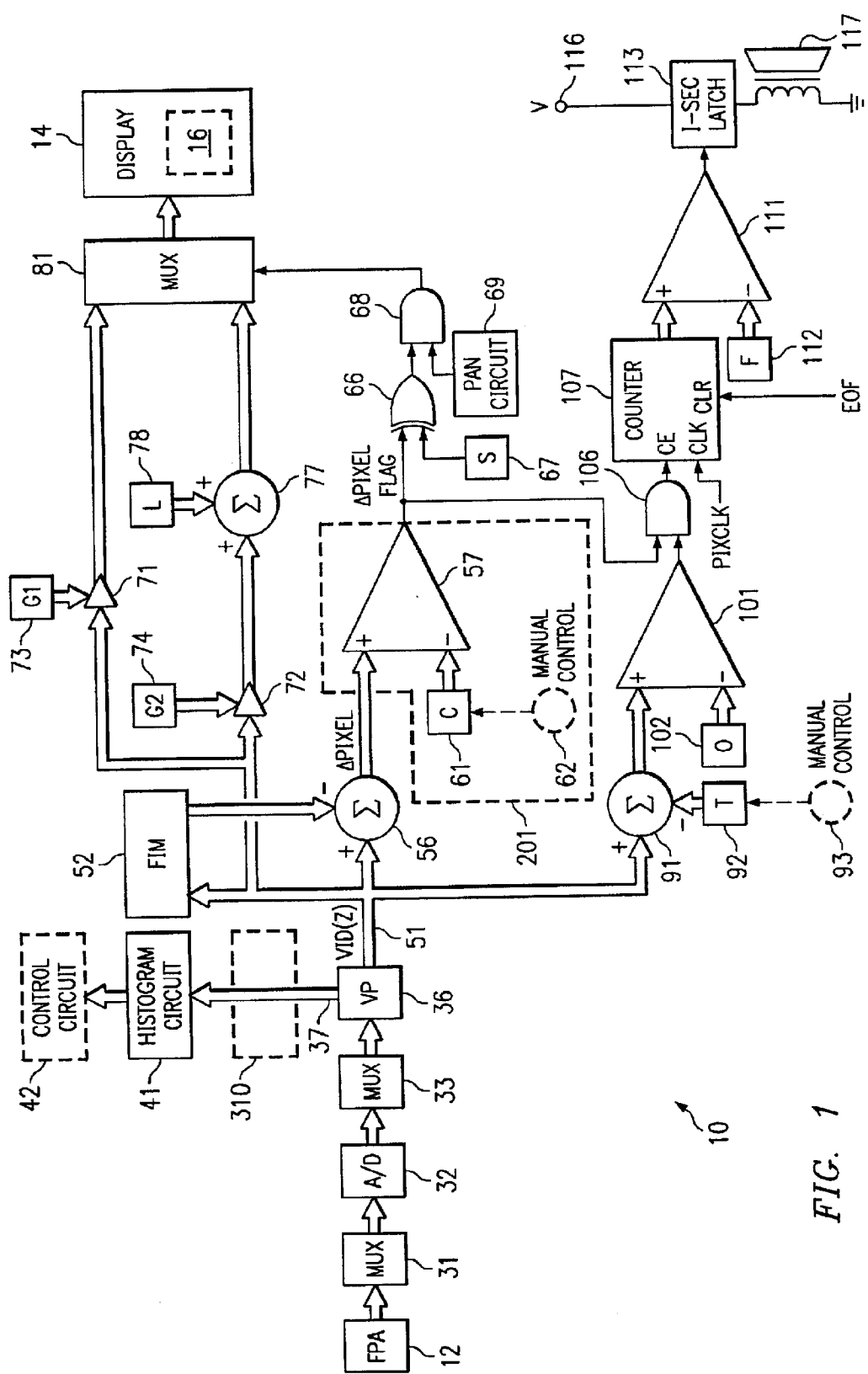
FIG. 1 is a block diagram of an infrared imaging apparatus which embodies aspects of the present invention.

FIG. 1 is a block diagram of an infrared imaging apparatus 10, which embodies aspects of the present invention. Although the apparatus 10 is designed to work with infrared radiation, it will be recognized that the present invention is also compatible with other types of radiation. The apparatus 10 includes a focal plane array (FPA) 12. The FPA 12 is a commercially available device of a type known in the art. It includes a two-dimensional array of detector elements that each correspond to a respective pixel of an image produced by the FPA 12. The apparatus 10 also includes not-illustrated optics of a known type, which image infrared radiation from a scene onto the FPA 12. The FPA 12 then outputs analog electrical signals which represent a series of successive images of the scene, where each image can alternatively be called a frame.

The apparatus 10 further includes a display section 14, which in turn includes a liquid crystal display (LCD) 16 of a known type. The LCD 16 includes a two-dimensional array of pixels, which it uses to produce visible images. In the disclosed embodiment, the LCD 16 has 1315 columns of pixels and 480 rows of pixels, but it could alternatively have some other configuration of pixels. Also, it will be recognized that use of the LCD 16 is exemplary, and that the LCD 16 could be replaced with some other type of display, such as a cathode ray tube (CRT) display. Images produced by the FPA 12 are processed by the apparatus of FIG. 1 in a manner which is described in more detail later, and the processed images are then supplied to the display 14 for presentation on the LCD 16.

Assume that the apparatus 10 is being used to observe a wooded area which happens to have a person standing within the wooded area. Although the person might have a slightly different thermal characteristic than the surrounding natural environment, it may nevertheless be somewhat difficult to distinguish the person from the surrounding environment in an image displayed on the LCD 16, especially when the person is not moving. Even if the person is moving, and in the absence of certain features according to the invention, the presence of the person may not be immediately apparent from an image displayed on the LCD 16. In this regard, it is possible for an operator observing the scene on the LCD 16 to be unaware of the presence of a person moving around within the scene, for example where the operator is somewhat tired, and/or has been using the apparatus 10 for a relatively long period of time. In order to make it much easier for an operator to detect the presence of movement within the scene, techniques have previously been developed to detect and flag movement. These techniques are known in the art as moving target indicator (MTI) techniques. The apparatus 10 of FIG. 1 implements a new form of MTI capability, which is discussed below and which embodies aspects of the present invention.

Figure 2:
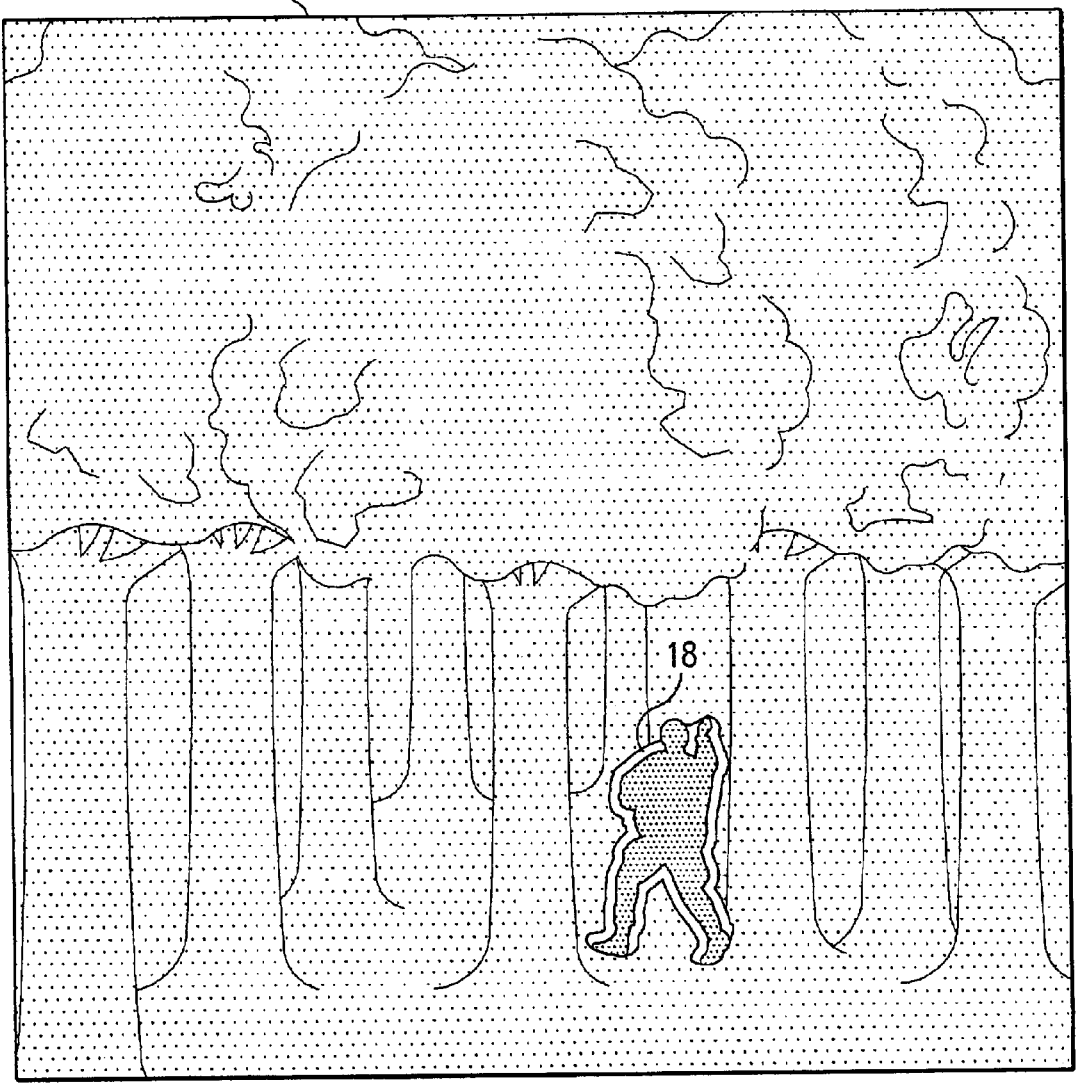
FIG. 2 is a diagrammatic view of an exemplary image presented on a display in the apparatus of FIG. 1.

In this regard, FIG. 2 is a diagrammatic view of the LCD 16, showing an example of an image which is displayed on the LCD 16 after being generated using techniques that embody aspects of the present invention. This is an image of the type of scene discussed above, where a person is moving within a wooded area. Successive images from the FPA 12 can be compared to identify movement. For example, a given pixel may correspond to part of the body of a person in one image, and then correspond to part of the natural background in the next image, due to the fact that the person has moved. Similarly, a different pixel which corresponded to a part of the natural background in the first image might correspond to a part of the body of the person in the second image.

When a comparison of successive images shows that the thermal energy associated with a given pixel has changed fairly significantly, that pixel is highlighted in the image displayed on the LCD 16. In contrast, pixels which have not experienced a similar change between the two images are displayed with a lesser degree of brightness. As shown at 18 in FIG. 2, this results in highlighting around the edges of a person or object which is moving within the scene, thereby making it very easy for an operator to detect the presence of movement within the scene, even when the operator is relatively tired. The manner in which this is effected utilizing aspects of the invention is discussed in more detail below.

Referring again to FIG. 1, the FPA 12 of the disclosed embodiment takes the data representing each image, and outputs respective portions of it through sixteen output channels. Each of these sixteen output channels is coupled to a respective input of an analog multiplexer (MUX) circuit 31, which has four output channels. The MUX 31 handles the sixteen channels at its inputs as four groups of four channels. In particular, the MUX 31 takes the four channels of each group and multiplexes all of the data from these four channels onto a respective one of the four output channels from the MUX 31.

An analog-to-digital (A/D) converter circuit 32 has four identical sections, which are not separately illustrated. The A/D circuit 32 has four input channels which are each coupled to a respective output channel from the MUX 31, and which are each associated with a respective one of the sections in the A/D circuit 32. The A/D circuit 32 also has four output channels, which are each associated with a respective one of the sections in the A/D circuit 32. Each section of the A/D circuit 32 includes a sample and hold circuit and a respective analog-to-digital conversion circuit. Each section of the A/D circuit 32 converts analog information received from the MUX 31 on a respective channel to digital information which is output through a respective output channel of the A/D circuit 32. The four output channels of the A/D circuit 32 are each coupled to a digital multiplexer (MUX) circuit 33. The MUX 33 multiplexes the digital data from each of the four channels at its inputs into a single output channel, which is supplied to a video processing (VP) circuit 36. The circuits 31–33 and 36 are each a circuit of a type known in the art, and the internal configurations of these circuits are therefore not illustrated and described here in detail.

The VP circuit 36 prepares histogram data and supplies it along a path 37 to a histogram circuit 41 of a type known in the art. For each image from the FPA 12, the histogram data includes a series of values which represent the thermal energy level associated with each of the pixels in the image. The histogram circuit 41 takes each of these values and uses it as an address to a not-illustrated memory, and increments the value in the addressed memory location. The memory locations are all cleared at the beginning of the data for each image. Thus, when all of the data for a given image has been processed, each location in the memory will correspond to a respective different thermal energy level, and will contain a count of the number of pixels in the image which have that particular energy level. A control circuit 42 can periodically extract this information from the histogram circuit 41, and can use it in a known manner, for example to develop gain and offset corrections for respective detector elements in the FPA 12. The control circuit 42 is also coupled to other components in the apparatus 10, but for clarity FIG. 1 does not depict every path by which the control circuit 42 is coupled to other components.

Video information which has been processed by the VP circuit 36 is supplied along a path 51 to a frame integration memory (FIM) 52, and is identified in FIG. 1 by the label VID(Z). The FIM 52 maintains for each pixel of the FPA 12 a respective integrated value, which is an function of several values of that pixel obtained from several prior successive images or frames. In this integrated value, the pixel values from more recent images are given more weight than the pixel values from less recent images. The specific manner in which this is carried out is described in more detail later. While the FIM 52 is receiving the current value for a given pixel on the path 51, it is also outputting a history value which, as discussed later, is a combination of both the current value and also the stored integrated value for that pixel.

The video data VID(Z) on path 51 is also supplied to one input of a summation circuit 56, and the history value from the FIM 52 is supplied to a second input of the circuit 56. The summation circuit 56 serves as a subtract which subtracts the history value from the current value, in order to produce a difference value ΔPIXEL which is supplied to a non-inverting input of a comparator 57. A further input of the comparator 57, which is an inverting input, receives a value stored in a register 61. In the disclosed embodiment, the value in the register 61 is a constant which is loaded into the register 61 by the control circuit 42, and which does not change during normal operation. The value in register 61 is a sensitivity value, which determines how large a difference is needed between the current and history values of a pixel in order to cause the apparatus 10 to highlight that pixel on the LCD 16 (in the manner shown at 18 in FIG. 2). In an alternative configuration, the value in the register 61 can be varied manually by an operator using a manual control, which is indicated diagrammatically in FIG. 1 by broken lines 62.

The output of the comparator 57 is a logic signal ΔPIXEL FLAG, which is a logic low if the current value for a pixel is not significantly different from the history value, and which is a logic high if the current value differs from the history value by an amount which is greater than the constant value present in register 61. This logic signal is applied to one input of an exclusive OR gate 66, the other input of which is controlled by a one-bit register 67 containing a switch value S. The purpose of the gate 66 is to pass the ΔPIXEL FLAG signal with or without inverting it, depending on the state of the bit in register 67. Register 67 is loaded by the control circuit 42, and the control circuit thus determines whether the gate 66 does or does not effect an inversion of the signal passing through it.

The output of the gate 66 is coupled to one input of an AND gate 68, which serves as a pan gate. The other input of gate 68 receives an output signal from a pan circuit 69. In general, the present discussion assumes that the apparatus 10 is kept stationary with respect to the scene which is being observed. However, the operator may occasionally move the apparatus 10 with respect to the scene, which is known as scanning or panning across the scene. It will be recognized that, when this occurs, virtually everything in the image will be changing, and thus most or all of the pixels would qualify to be highlighted in the manner shown at 18 in FIG. 2. In order to avoid highlighting most or all of the pixels being displayed on the LCD 16, the pan circuit 69 is configured to detect a situation in which the apparatus 10 is being panned relative to the scene, and to use the gate 68 to disable the output signal from the gate 66, so that no pixels on the LCD 16 are highlighted during the panning motion. The structure and operation of the pan circuit are described in more detail later.

The video data VID(Z) on path 51 is also supplied to an input of each of two variable gain circuits 71 and 72. The gain of the circuit 71 is controlled by a value G1 which is loaded into a register 73 by the control circuit 42. Similarly, the gain of the circuit 72 is controlled by a value G2 which is loaded into a register 74 by the control circuit 42. The output of the gain circuit 72 is coupled to one input of a summation circuit 77, the other input of which is coupled to the output of a bias register 78. A bias value L is loaded into the register 78 by the control circuit 42. The summation circuit 77 functions as an adder. The summation circuit 77 adds the value in register 78 to the output of the gain circuit 72, in order to effectively add to the output of the gain circuit 72 a fixed bias which is not subject to the gain factor of the gain circuit 72.

The output of the gain circuit 71 and the output of the summation circuit 77 are coupled to respective inputs of a multiplexer (MUX) circuit 81, which has a select input controlled by the output of gate 68. The multiplexer 81 couples to its output a respective one of its two inputs, depending on the state of the output of gate 68. The output of the MUX 81 is supplied to the display section 14.

In operation, the current value for a pixel of the current image is subjected to one gain in the gain circuit 71, and is subjected to a different gain in the gain circuit 72. The gain applied by gain circuit 71 may be larger or smaller than the gain applied by gain circuit 72. In the disclosed embodiment, the gain circuit 71 determines the value used for highlighted pixels such as those shown at 18 in FIG. 2, whereas the gain circuit 72 determines the value used for other pixels in the image. Alternatively, however, the gain circuit 72 could determine the value used for highlighted pixels such as those shown at 18 in FIG. 2, and the gain circuit 71 could determine the value used for other pixels in the image. When a pixel is to be highlighted, the gate 68 causes the MUX 81 to supply the output of gain circuit 71 to the display section 14, whereas if the same pixel was not to be highlighted the MUX 81 would supply to the display section 14 the output of the summation circuit 77, which is a function of the output S of gain circuit 72. It will be recognized that changing the value in register 78 effects a linear change in the brightness difference between the pixels which are highlighted and the pixels which are not highlighted.

As mentioned above, the summation circuit 56 calculates the difference between the current value for a given pixel and a history value for that pixel which is a function of values for that pixel from multiple prior images. If the difference is larger than the threshold or sensitivity value in register 61, the comparator 57 will output a logic high which, through the gates 66 and 68, causes the MUX 81 to select and pass the output of gain circuit 71, which in turn effects highlighting of that pixel in the image on LCD 16. Alternatively, if the comparator 57 determines that the difference value from summation circuit 56 is less than the threshold value in register 61, it outputs a logic low, which through gates 66 and 68 causes the MUX 81 to select and pass the output of summation circuit 77, so that the pixel is displayed in the image on LCD 16 with an intensity which is less than the intensity of pixels that pass through the gain circuit 71. As one specific example, the gain circuit 72 could have a unity gain value, the register 78 could contain an offset value of zero, and the gain circuit 71 could have a gain value which is greater than unity, but of course it would alternatively be possible to utilize a variety of other gain and offset values.

As evident from the foregoing discussion, pixels within the displayed image are selectively highlighted in order to visually draw the attention of an operator to portions of the scene in which movement has been detected. A further aspect of the invention supplements this visual indication of detected movement with an audible indicator. More specifically, the current video data VID(Z) on path 51 is supplied to one input of a summation circuit 91, the other input of which receives an output of a register 92. The register 92 is loaded by the control circuit 42, and contains a constant which determines the sensitivity of the audible alarm. In an alternative configuration, the value in register 92 could be varied by an operator using a manual control, which is shown diagrammatically by broken lines at 93.

The summation circuit 91 serves as a subtractor, which determines the difference between the current video value and the sensitivity value in register 92. The output of the summation circuit 91 is supplied to one input of a comparator 101, the other input of which is coupled to outputs of a register 102. The register 102 is loaded by the control circuit 42 with a reference value, which in the disclosed embodiment is zero. The output of the comparator 101 is coupled to one input of a two-input AND gate 106, the other input of which is coupled to the output of comparator 57. The output of the gate 106 is coupled to the count enable input of a counter 107.

The counter 107 has a clock input coupled to a pixel clock signal PIXCLK, which is a series of pulses synchronized to the data placed on path 51 for respective pixels in the current image. The counter 107 has a clear input controlled by an end of frame signal EOF, which occurs at the end of each image or frame, or in other words at the start of the next successive image or frame. The value in counter 107 is supplied to one input of a comparator 111, the other input of which is coupled to the output of a register 112. The register 112 is loaded by the control circuit 42 with a value which determines the threshold for generation of an audible indication of detected movement within the scene. The output of the comparator 111 is coupled to a control input of a one-second latch 113, which is coupled between a source of power 116 and a sound-producing device such as a buzzer or miniature speaker 117. When activated by the output of comparator 111, the latch 113 closes for at least one second in order to supply power to the speaker 117 for at least one second and thus generate an audible tone which lasts for at least one second.

As discussed earlier, the ΔPIXEL FLAG signal produced by the comparator 57 is a logic high when the current value for a given pixel is sufficiently different from the history value of prior pixels so that movement is believed to be occurring at that pixel and so that the pixel will thus be highlighted in the LCD 16 of the display 14. Assuming that the gate 106 is normally enabled by the comparator 101, a logic high output from the comparator 57 will pass through gate 106 and enable the count enable input of the counter 107, so that the counter 107 will be clocked and thus incremented by the pixel clock signal PIXCLK.

The counter 107 will thus contain a progressively increasing count of the number of pixels in the current image which will be highlighted on the LCD 16. When this value in counter 107 exceeds the value in register 112, the comparator 111 energizes its output to indicate that the number of pixels being highlighted in the image has exceeded a specified threshold, thus justifying the generation of an audible sound. This output from comparator 111 activates the latch 113, which causes power to be supplied to the speaker 117 for at least one second, so that the speaker 117 generates an audible tone which lasts at least one second.

The summation circuit 91 determines the difference between the current value for a given pixel and the threshold value present in register 92, and then the comparator 101 compares this difference to the reference value present in register 102. In general, if the current value VID(Z) for a pixel is relatively low, then the comparator 101 disables the gate 106 so that the counter 107 would not be incremented for that pixel, even if the comparator 57 determined that a significant change was occurring with respect to that pixel. In contrast, if the current value VID(Z) for that pixel is sufficiently large, the comparator 101 will enable the gate 106, so that the pixel can be taken into account by the counter 107. The summation circuit 91 and the comparator 101, in conjunction with the values in registers 92 and 102, serve to help reduce the occurrence of audible sound under circumstances that might be considered to be a false alarm. Of course, the counter 107 also helps to reduce the occurrence of false alarms.

Figure 3:
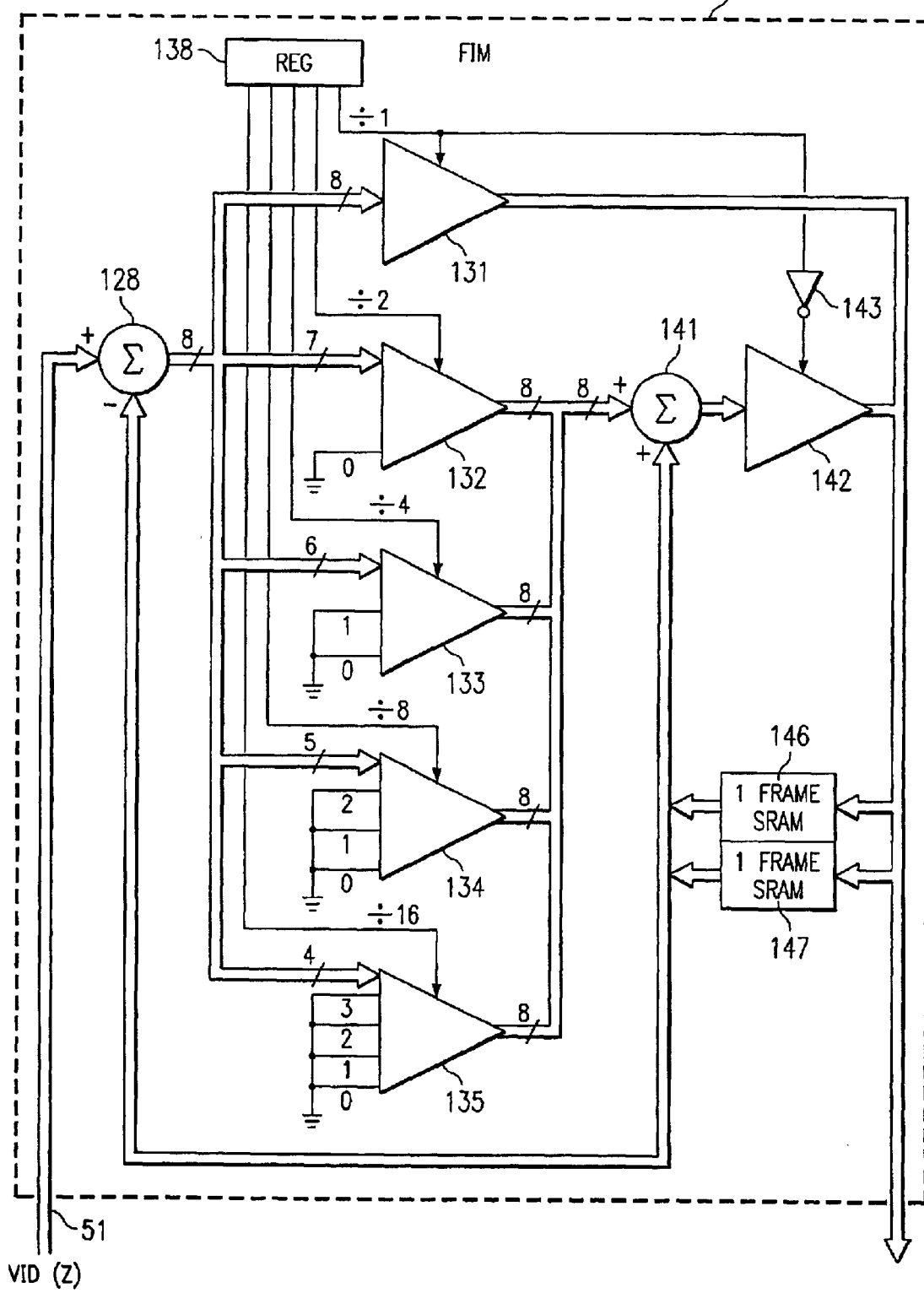
FIG. 3 is a block diagram of a frame integration memory circuit, which is a portion of the apparatus of FIG. 1.

FIG. 3 is a block diagram of circuitry within the frame integration memory (FIM) 52 of FIG. 1. Current video data VID(Z) entering the FIM 52 on path 51 is supplied to one input of a summation circuit 128. The summation circuit 128 functions as a subtractor, as discussed later, and outputs an eight-bit difference signal. The FIM 52 includes five groups of eight buffers, each group of eight buffers being represented in FIG. 3 by a single symbol which is identified by a respective one of the five reference numerals 131–135. As is well known, a binary value can be divided by successive powers of two by simply shifting data bits progressively to the right so as to drop one or more least significant bits, while adding an equal number of most significant bits which are zeroes. For example, a value is shifted one bit to the right to divide it by two, is shifted two bits to the right to divide it by four, is shifts three bits to the right to divide it by 8, and so forth.

The eight buffers in buffer group 131 each have an input coupled to a respective bit of the output of the summation circuit 128, without shifting bits left or right, and thus serves as a divide-by-one circuit which does not effect any change in the data passing through it. The buffer group 132 divides the output of summation circuit 128 by two, based on the manner in which the inputs of the buffers of the group 132 are coupled to the outputs of the circuit 128. In particular, the most significant buffer in group 132 has its input coupled to ground in order to define a binary "zero", and the other seven buffers in group 132, which represent the seven least significant bits, have their inputs respectively coupled to each of the seven most significant bits of the output from circuit 128, in a manner corresponding to a right shift of one bit. The least significant bit of the output of circuit 128 is ignored. In a similar manner, the buffer group 133 has inputs coupled to the output of circuit 128 so as to effect a divide-by-four function, the buffer group 134 effects a divide-by-eight function, and the buffer group 135 effects a divide-by-sixteen function.

A five-bit register 138 is loaded by the control circuit 42 (FIG. 1), and has five outputs which are each coupled to the enable inputs of all buffers in a respective one of the groups 131–135. At any given point in time, only one of the five bits in register 138 is set to a binary "1", the other bits all being set to a binary "0". Thus, only one of the buffer groups 131–135 is enabled at any given point in time.

A summation circuit 141 serves as an adder, and has an input port with eight bit positions which are each coupled to the output of a respective one of the buffers in each of the buffer groups 132–135. The buffers 131–135 have tri-state outputs. Since only one (or none) of the buffer groups 132–135 is enabled at any given point in time, only one (or none) of the buffer groups 132–135 will be supplying data to the summation circuit 141 at any given point in time.

Each bit position in the output of the summation circuit 141 is supplied to the input of a respective one of eight buffers in a further buffer group 142, and the enable inputs of the buffers in this group are controlled through an inverter 143 by the same signal which controls the enable inputs of the buffers in group 131. Thus, when the buffers in group 131 are enabled, the buffers in group 142 will be disabled, and vice versa.

The tri-state output of each buffer in group 131 is coupled to the tri-state output of a respective buffer in group 142, and these outputs collectively serve as the output from the FIM memory 52 which is coupled to the summation circuit 56 (FIG. 1). The outputs of buffer groups 131 and 142 are also coupled to inputs of two static random access memory (SRAM) circuits 146 and 147, and the outputs of the memories 146 and 147 are coupled to each other and to the second input of the summation circuit 128 and the second input of the summation circuit 141. The memories 146 and 147 each correspond to one frame of data, in that they each include a plurality of storage locations equal in number to the number of pixels present in an image or frame. Memories 146 and 147 are operated in a "ping-pong" manner. In particular, at any given point in time, one of the memories 146 and 147 will be accepting input but will not be producing any output, whereas the other will not be accepting input but will producing output. Each time the apparatus 10 of FIG. 1 finishes processing a frame of data, the operational status of the memories 146 and 147 is reversed or swapped.

The FIM 52 has an operational mode in which it performs frame integration. In this operational mode, the register 138 enables a selected one of the four buffer groups 132–135. For purposes of this discussion, it is assumed that the buffer group 132 is enabled, and that the memory 146 is outputting data and the memory 147 is accepting data. Current video data VID(Z) arriving on path 51 is supplied to summation circuit 128. Simultaneously, an integrated value corresponding to the same pixel is being read from memory 146, and is a function of several prior values for that pixel. This integrated value is supplied to the other input of summation circuit 128, which calculates the difference between the current value and the integrated value. This difference is supplied to buffer group 132, which effectively shifts it one bit to the right, while dropping the least significant bit and adding a zero in the most significant bit, in order to effectively divide the difference by two.

The value from the buffer group 132 is supplied to the summation circuit 141, where it is added to the integrated value from the memory 146. The output of the summation circuit 141 passes through the buffer group 142, is stored in a respective location of memory 147 and is also used as the history output from FIM 52. It will be recognized that, if the buffer group 132 was disabled and one of the buffer groups 133–135 was enabled, the operation of the FIM 52 would be similar, except that the output of circuit 128 would be divided by a different power of two, in order to change the effective weight given to this value within the summation circuit 141.

THE FIM 52 has an alternative mode of operation, in which it does not perform an integration function. In this alternative mode, the register 138 contains a value which enables the buffer group 131, and disables the buffer groups 132–135. In this alternative mode, neither of the memories 146 or 147 outputs any data. Consequently, current video data VID(Z) arriving on path 51 passes through summation circuit 128 and buffer group 131 and then is output from the FIM 52 without change. With reference to FIG. 1, it will be noted that, when the FIM 52 is operating in this non-integration mode, the summation circuit 56 will receive the same value at both of its inputs, and will thus always calculate a difference of zero, which in turn will mean that the apparatus 10 of FIG. 1 will not highlight any of the pixels displayed by the LCD 16. Consequently, although the FIM 52 has this non-integration mode of operation, it is assumed herein that the FIM 52 operates in one of its integration modes, rather than in the non-integration mode.

The foregoing discussion of FIG. 1 explained that the pan circuit 69 is configured to detect a situation in which the apparatus 10 is being panned or scanned across a scene, with the result that most or all of the pixels may be experiencing significant changes in values. The structure and operation of the pan circuit 69 will now be described in greater detail.

Figure 4:
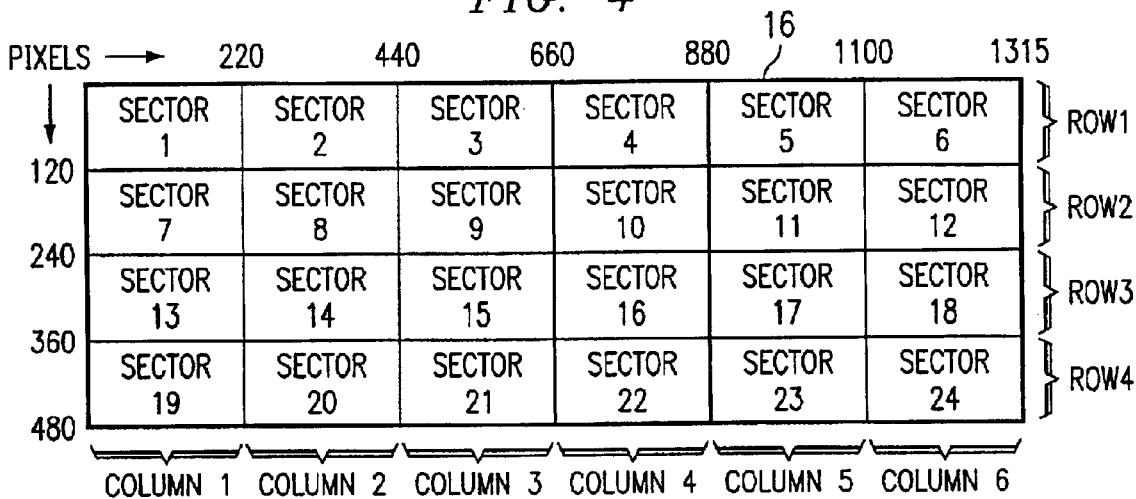
FIG. 4 is a diagrammatic view showing how the display in the apparatus of FIG. 1 is conceptually divided into sectors for the purpose of processing certain data.

The pan circuit 69 conceptually divides the LCD 16 into twenty-four different sectors. In this regard, FIG. 4 is a diagrammatic view of the LCD 16, showing twenty-four sectors arranged in a two-dimensional array of four rows and six columns. As mentioned above, the LCD 16 could have a variety of configurations in terms of the number of pixels in its height and its width, but in the disclosed embodiment is 1315 pixels wide and 480 pixels high. Consequently, each sector is 120 pixels in height, and 220 pixels in width, except for the sectors in Column 6, which are only 215 pixels in width. This division of the LCD 16 into sectors is purely conceptual, and does not represent any form of actual physical sectoring within the LCD 16.

As discussed in more detail below, the pan circuit 69 evaluates for each sector how many pixels in that sector appear to be experiencing significant change. For the sectors in Row 1 of FIG. 4, the pan circuit 69 identifies the sectors for which at least sixteen pixels are to be highlighted in the display 16. For each of the sectors in Row 2 through Row 4, the pan circuit 69 identifies the sectors for which at least sixty-four pixels are to be highlighted in the image displayed on LCD 16. If at least eighteen of the twenty-four sectors are found to meet the applicable criteria, then the pan circuit 69 disables the gate 68, in order to prevent any pixels from being highlighted in the image displayed on LCD 16. The manner in which this is effected is explained in more detail with reference to FIG. 5.

Figure 5:
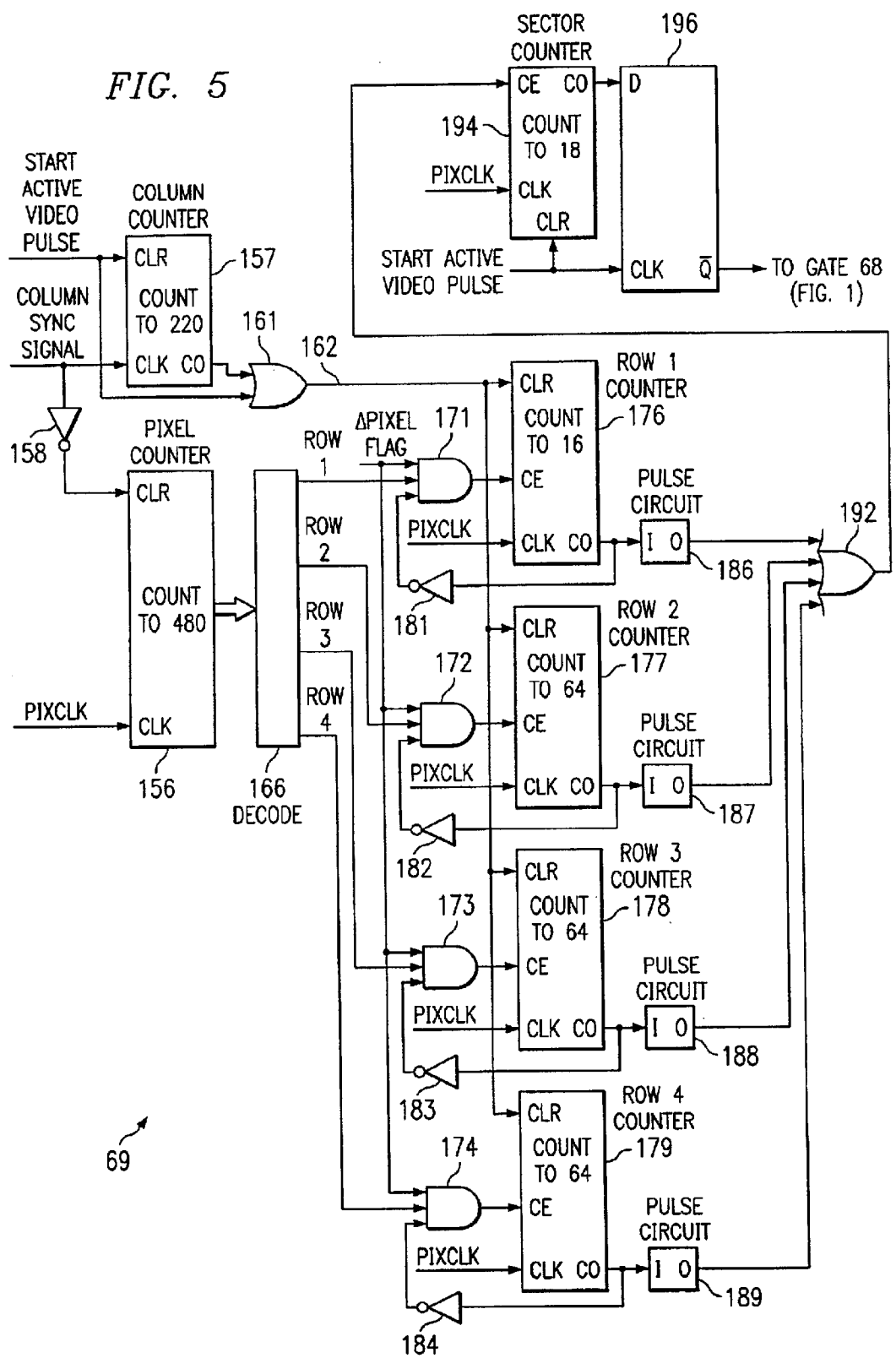
FIG. 5 is a schematic circuit diagram showing in greater detail a pan circuit which is part of the apparatus of FIG. 1.

More specifically, FIG. 5 is a schematic diagram showing the circuitry within the pan circuit 69. In order to analyze the current image, the pan circuit 69 begins with a column of pixels which is one pixel wide and which is located at the left side of the image. The pan circuit 69 works from the top to the bottom of this column, and thus handles the leftmost pixels in sector 1 (FIG. 4), followed by the leftmost pixels in sector 7, followed by the leftmost pixels in sector 13, and then the leftmost pixels in sector 19. The pan circuit 69 then moves to the next column of pixels, which is also one pixel wide, and again works from the top to the bottom of this column. In handling this second column of pixels, the pan circuit 69 handles different pixels which are successively in sector 1, sector 7, sector 13 and sector 19. In this manner, the pan circuit 69 works its way from the left side of the image to the right side of the image in columns of single pixels.

In FIG. 5, a pixel counter 156 is provided to count the pixels in each column as the pan circuit 69 works from the top to the bottom of that column. The counter 156 is clocked by the pixel clock signal PIXCLK, which as discussed above is a series of pulses synchronized to the data placed on path 51 (FIG. 1) for respective pixels in the current image. A COLUMN SYNC signal, which occurs at the start of each column of pixel data, is coupled through an inverter 158 to a clear input of the counter 156. Each time the counter 156 reaches a count of 480, it automatically recycles to 1 as the pan circuit 69 shifts from the bottom of the current column of pixels to the top of the next column of pixels.

The pan circuit 69 also has a column counter 157. The column counter 157 has a clear input, which is coupled to a START ACTIVE VIDEO PULSE signal that occurs at the start of active video data for each image or frame. The counter 157 is clocked by the COLUMN SYNC signal. As the pan circuit 69 works its way progressively from left to right across the pixel columns that extend vertically through sectors 1, 7, 13 and 19, the counter 157 counts from 1 to 220, and is then reset to 1. Thereafter, as the pan circuit 69 works its way across the pixel columns that extend vertically through sectors 2, 8, 14 and 20, the counter 157 again counts from 1 to 220, and so forth.

Each time the column counter 157 reaches 220 it produces a carry out signal, which is applied to one input of a two-input OR gate 161, the other input of which is coupled to the same line as the clear input of the counter 157. Thus, the gate 161 outputs a signal 162 which is a clear signal, which occurs when the pan circuit 69 begins analyzing the current image, and which occurs again each time the pan circuit finishes analyzing one of the six columns of sectors (FIG. 4) in the image.

The value in the pixel counter 156 is supplied to a decode circuit 166, which has four outputs ROW1 through ROW4. At any given point in time, the decode circuit 166 energizes only one of its outputs, indicating which of the four rows of sectors (FIG. 4) contains the pixel that is currently being processed. The outputs of the decode circuit 166 are each coupled to one input of a respective one of four three-input AND gates 171–174. The output signal ΔPIXEL FLAG from the comparator 57 (FIG. 1) is coupled to a second input of each of the AND gates 171–174.

The outputs of the gates 171–174 are each connected to the count enable input of a respective one of four row counters 176–179, each of which corresponds to a respective one of the four rows of sectors (FIG. 4). The clear signal 162 from the gate 161 is connected to the clear input of each of the counters 176–179, and the clock signal PIXCLK is coupled to the clock input of each of these counters. The counter 176 is configured to count to 16 and to then produce a carry out signal, whereas the counters 177–179 are each configured to count to 64 and to then produce a carry out signal.

The carry output of each counter is coupled through a respective one of four inverters 181–184 to the remaining input of a respective one of the gates 171–174 which is associated with that counter. The carry outputs of the counters 176–179 are also coupled to inputs of respective pulse circuits 186–189. Each of the pulse circuits 186–189 is a known type of circuit, such as a monostable multivibrator or "one-shot", which produces a pulse of predetermined length in response to a rising edge at its input. In the disclosed embodiment, each such pulse has a duration which is equal to the period of the pixel clock PIXCLK.

The outputs of the pulse circuits 186–189 are each coupled to a respective input of a four-input OR gate 192. The output of the gate 192 is coupled to the count enable input of a sector counter 194, which is clocked by the pixel clock signal PIXCLK. The counter 194 is configured to count to 18 and to then produce a carry out signal, which is coupled to the data input of a D-flip flop 196. The active-low data output of the flip flop 196 serves as the output of the pan circuit 69. As shown in FIG. 1, this output of the pan circuit 69 is coupled to an input of the gate 68. The clear input of the counter 194 and the clock input of the flip flop 196 are both driven by the START ACTIVE VIDEO PULSE signal, which as discussed above is also coupled to the clear input of the counter 157.

As explained above, the pan circuit 69 analyzes the current image by working from the left side of the image to the right side of the image on a column-by-column basis, where the columns are each a single pixel wide. Beginning with the leftmost single-pixel column, as the pan circuit 69 works it way down this column, the pixel counter 156 counts the pixels. The decode circuit 166 activates its ROW1 output for the first 120 pixels, activates its ROW2 output for the next 120 pixels, and so forth. When the pan circuit 69 moves to the next single-pixel column, the decode circuit 166 repeats this cycle. Thus, when the pixel currently being analyzed is located in a sector in the first row of sectors (Row 1), the decode circuit 166 will be enabling the gate 171 and disabling the gates 172–174. When the pixel currently being analyzed is located in a sector in Row 2, the decode circuit 166 will be enabling gate 172 and disabling gates 171–174, and so forth.

If the comparator 57 (FIG. 1) activates the signal ΔPIXEL FLAG, in order to indicate that the current pixel will be highlighted in the LCD 16, one of the gates 171–174 which is currently enabled by the decode circuit 166 will enable the corresponding one of the counters 176–179, and that counter will be incremented. Thus, while the pan circuit 69 is analyzing the pixels in the left column of sectors in FIG. 4, the counter 176 will be counting the number of pixels in sector 1 which will be highlighted, the counter 177 will be counting the number of pixels in sector 7 which will be highlighted, the counter 178 will be counting the number of pixels in sector 13 which will be highlighted, and the counter 179 will be counting the number of pixels in sector 19 which will be highlighted.

If the counter 176 reaches a count of 16, it produces a carry out signal which, through the inverter 181, disables the gate 171 so that the counter 176 will stop counting and remain at this maximum value. The carry out from the counter 176 also causes the pulse circuit 186 to produce an output pulse which, through the gate 192, causes the sector counter 194 to increment. Similarly, if the counter 177 counts 64 pixels in sector 7 which will be highlighted, it produces a carry out which disables the gate 172 through inverter 182, and which causes the pulse circuit 187 to produce a pulse through gate 192, thereby causing the sector counter 194 to increment. In a similar manner, if counters 178 and 179 reach a count of 64, they will disable the associated gates 173 and 174 and cause the sector count 194 to be incremented.

As the pan circuit 69 finishes analyzing the left column of sectors in FIG. 4 (sectors 1, 7, 13 and 19), the column counter 157 outputs a pulse which, through gate 161, resets the four row counters 176–179. Therefore, as pan circuit 69 analyzes pixels in the next column of sectors in FIG. 4, the counters 176–179 will respectively count the number of pixels in sectors 2, 8, 14 and 20 which will be highlighted in the display. As the pan circuit 69 works its way through the image, the sector counter 194 may reach a count of 18 and produce a carry out signal, which indicates that at least 18 of the 24 sectors have a predetermined number of pixels that will be highlighted. After all data for the current image has been processed, the carry out signal from the counter 194 is loaded into the flip flop 196, which holds that value throughout the processing of the next image. If the flip flop 196 contains a binary "1", it represents a determination by the pan circuit 69 that at least 18 sectors have a significant number of pixels which are changing, and the pan circuit 69 treats this as recognition that the apparatus 10 of FIG. 1 is being panned or scanned across the scene. Therefore, the output of flip flop 196 disables the gate 68 (FIG. 1) in order to cause the MUX 81 to avoid highlighting any pixels in the image displayed on the LCD 16. On the other hand, if the flip flop contains a binary "0", indicating that less than 18 sectors had a significant number of pixels that changed, the gate 68 is enabled so that selected pixels of the displayed image are highlighted.

Figure 6A:
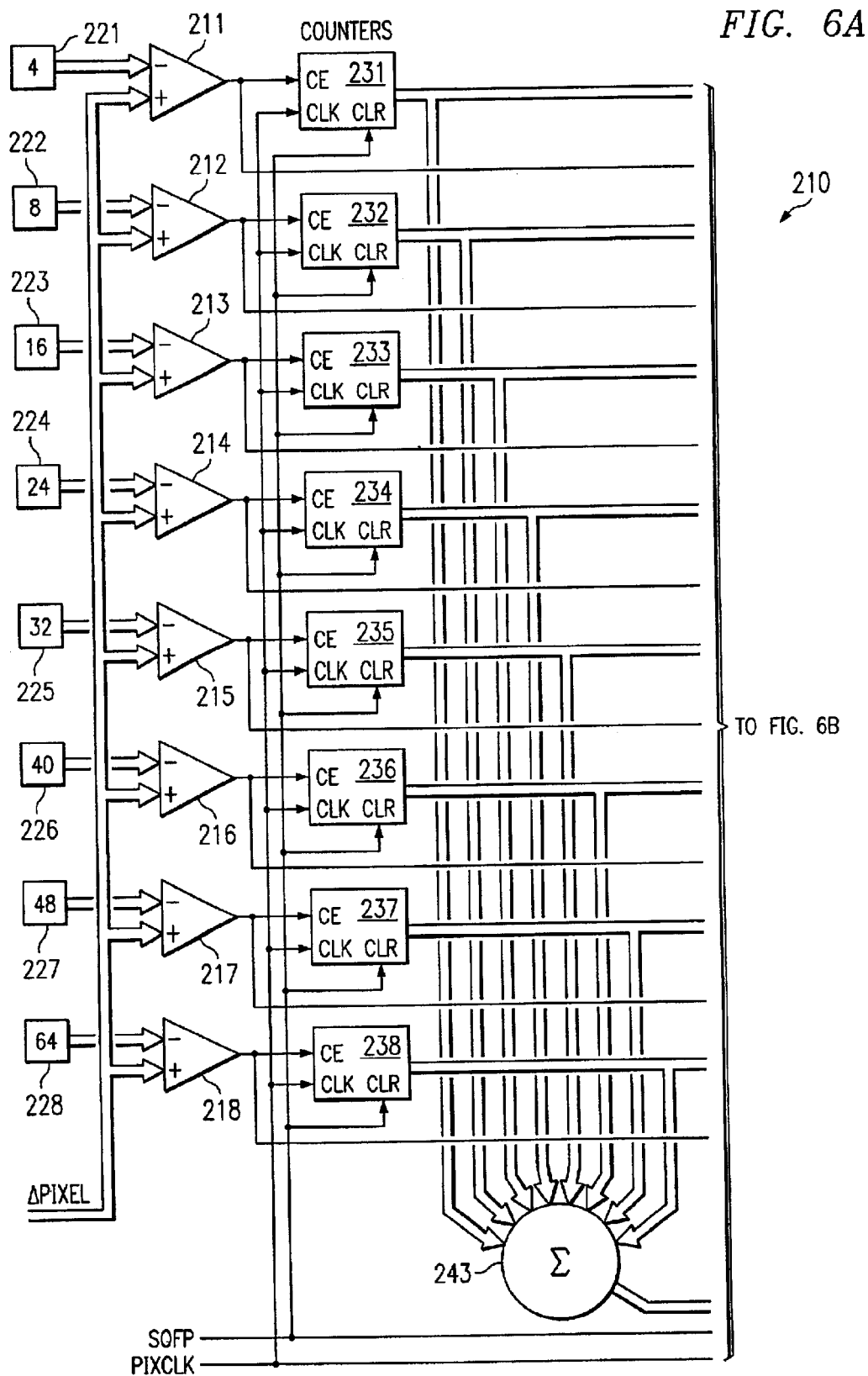
FIG. 6 is a block diagram of a circuit which is an alternative embodiment of a portion of the apparatus of FIG. 1.
Figure 6B:
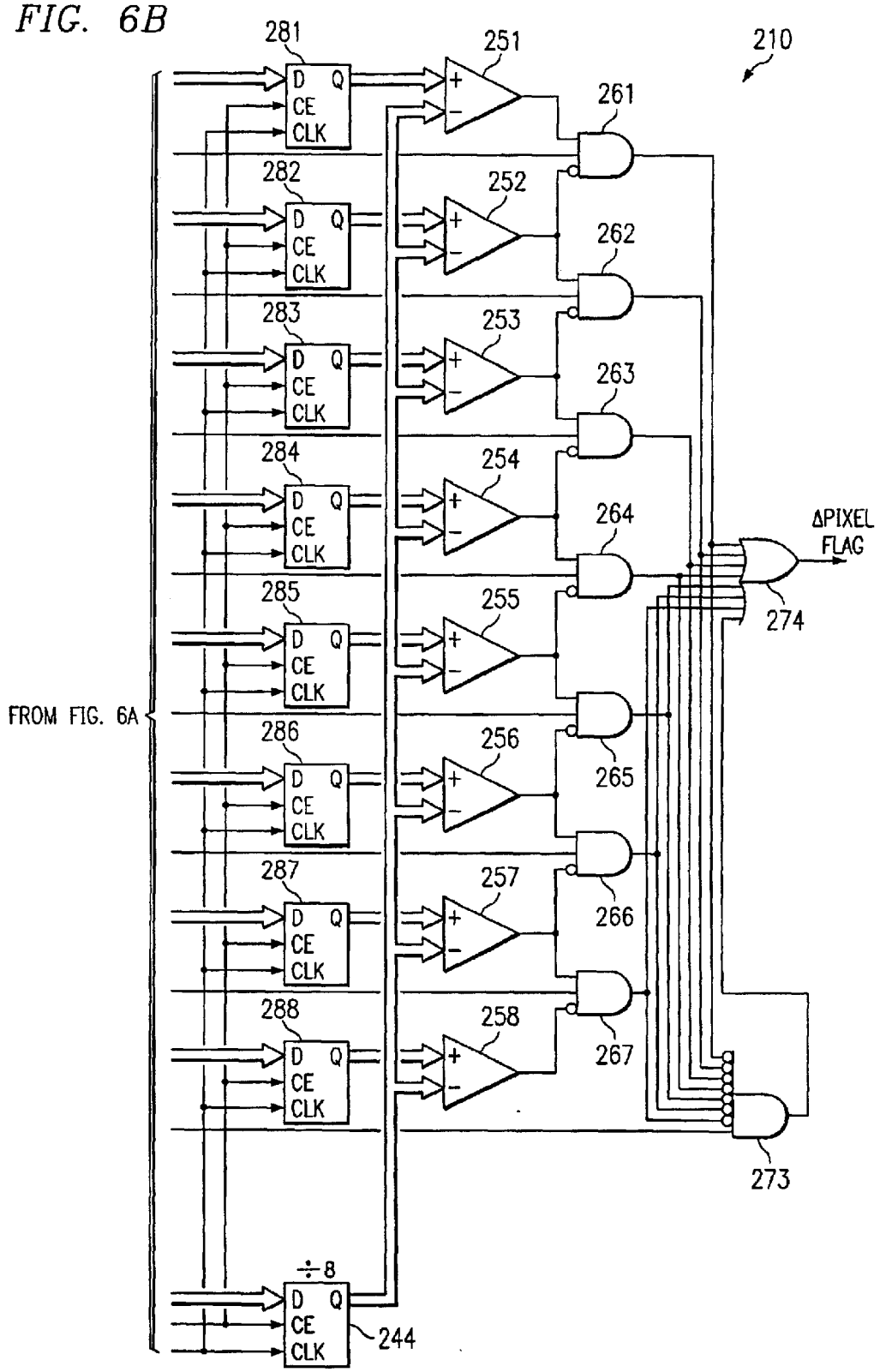

Referring again to FIG. 1, broken line 201 designates a portion of the circuitry of apparatus 10. As discussed above, the circuit portion 201 determines which pixels will be highlighted in the image displayed on the LCD 16, based on whether a difference determined by the summation circuit 56 exceeds a threshold. In the embodiment of FIG. 1, the threshold is determined by a constant present in register 61, or could alternatively be manually adjusted by a manual control 62. FIG. 6 is a diagrammatic view of a circuit 210 which is an alternative embodiment of the portion 201 of FIG. 1, and which could be substituted for the portion 201 of FIG. 1. Where the circuit portion 201 uses a constant threshold defined by a value in register 61, or permits manual variation of the threshold using manual control 62, the circuit 210 instead effects an automatic and adaptive adjustment of the threshold.

In more detail, the circuit 210 includes eight comparators 211–218, which each have one input coupled to the ΔPIXEL value produced by the summation circuit 56 of FIG. 1. The other input of each of the comparators 211–218 is coupled to the output of a respective one of eight registers 221–228. Each register is loaded with a respective different constant value by the control circuit 42 (FIG. 1). In the disclosed embodiment, the registers 221–228 contain respective constant values of 4, 8, 16, 24, 32, 40, 48 and 64, but it would alternatively be possible to use other constant values.

The output of each of the comparators 211–218 is coupled to the count enable input of a respective one of eight counters 231–238. Each of the counters 231–238 has a clock input coupled to the pixel clock signal PIXCLK. Further, each of the counters 231–238 has a clear input coupled to a start of frame pulse signal (SOFP), which occurs at the beginning of each frame or image of data.

A summation circuit 243 has eight inputs which are each coupled to the output of a respective one of the counters 231–238, and which serves to add the values present in all of the counters 231–238. The output of the summation circuit 243 is coupled to the data input port of a register 244, except that the three least significant bits from the output of the circuit 243 are ignored. Thus, the input to register 244 effectively represents the output of the circuit 243 divided by eight. Since there are eight registers 231–238, the value loaded into the register 244 effectively represents an average of the values in all of the counters 231–238. The register 244 has a clock input which is coupled to the pixel clock signal PIXCLK, and has an enable input which is coupled to the start of frame pulse signal SOFP.

The circuit 210 also includes eight registers 281–288, which each have an 8-bit data input port coupled to the 8-bit data output port of a respective one of the counters 231–238. Each of the registers 281–288 is clocked by the pixel clock signal PIXCLK, and has a count enable input controlled by the start of frame pulse signal SOFP. The circuit 210 further includes eight comparators 251–258, which have an 8-bit input port coupled to the 8-bit output port of a respective one of the registers 281–288. Each of the comparators 251–258 has its other input port coupled to the outputs of the register 244.

Seven AND gates 261–267 each have one input coupled to the output of a respective one of the comparators 251–257. Further, the gates 261–267 each have an active-low input which is coupled to the output to a respective one of the comparators 252–258. Further, the gates 261–267 each have an input which is coupled to the output of a respective one of the comparators 211–217. An eight-input AND gate 273 has seven active-low inputs which are each coupled to the output of a respective one of the gates 261–267. The gate 273 also has an active-high input, which is coupled to the output of the comparator 218. An eight-input OR gate 274 has seven inputs which are each coupled to the output of a respective one of the gates 261–267, and has a further input coupled to the output of the gate 273. The output of the gate 274 serves as the ΔPIXEL FLAG signal, which is the output of the circuit 210. As shown in FIG. 1, the ΔPIXEL FLAG signal is coupled to an input of gate 66 and to an input of gate 106.

As the system is processing an image, the ΔPIXEL signal for each pixel is subjected to a comparison in each of the comparators 211–218. Since the values in the registers 221–228 increase progressively from register 221 to register 228, if any one of the comparators 211–218 is activating its output, all of the comparators above it in FIG. 6 will also be activating their outputs. For example, if the current ΔPIXEL value is 45, comparators 211–216 will be activating their outputs, but comparators 217 and 218 will not be activating their outputs. Similarly, if the value is 18, comparators 211–213 will be activating their outputs, but comparators 214–218 will not be activating their outputs.

For each comparator which activates its output, the associated one of the counters 231–238 will be incremented. It will be recognized that, when any given counter is incremented, all of the counters above it will also be incremented at the same time. Thus, the value in each counter will always be less than or equal to the values in the counters above it, and greater than or equal to the values in the counters below it. Stated differently, the values present in the counters 231–238 will increase progressively in a direction from the counter 231 to the counter 238.

When the system has completed processing of the current frame or image, and is ready to begin the next frame or image, it generates a start of frame pulse signal SOFP, which enables loading of the registers 244 and 281–288 in FIG. 6. At this point in time, the summation circuit 243 will be outputting the sum of the values in all of the counters 231–238, and a value equal to this sum divided by eight will be present at the inputs to the register 244, by virtue of the fact that the register 244 ignores the three least significant bits of the output of the summation circuit 243. This value, which as discussed above represents an average of the values in the counters 231–238, is loaded into the register 244, and remains there throughout processing of the next frame or image. The start of frame pulse SOFP also causes each of the registers 281–288 to be loaded with the value present in the associated one of the counters 231–238, and causes each of the counters 231–238 to be cleared before the system begins processing the next frame or image.

As the system is processing the next frame or image, the comparators 251–258 compare the values in the registers 281–288 to the average value present in the register 244. It will be recognized that, if any one of the comparators 251–258 is energizing its output, all of the comparators above it will be energizing their outputs.

No more than one of the gates 261–267 is ever enabled at any given point in time, and sometimes none of the gates 261–267 are enabled. For example, assume that the outputs of the comparators 251–255 are energized, and that the outputs of the comparators 256–258 are not energized. The gates 261–264 will be disabled by virtue of the signals supplied to their active-low inputs from the comparators 252–255, respectively. The gates 266 and 267 will be disabled, by virtue of the fact that the comparators 256 and 257 are supplying logic low signals to the gates 266 and 267, respectively. Only the gate 265 will be enabled, and will be passing the output of the comparator 215 through to the gate 274, which in turn passes this signal so that it serves as the ΔPIXEL FLAG signal.

Alternatively, assume that the comparators 251–258 all have their outputs activated. In this situation, gates 261–267 are all disabled by virtue of the signals supplied to their active-low inputs from the comparators 252–258, respectively. Since the gates 261–267 are all disabled, the gate 273 will be enabled, and will be passing the output of comparator 218 through to the gate 274, so that it serves as the ΔPIXEL FLAG signal.

Thus, the system adaptively selects which one of the gates 261–273 will be enabled, and this in turn determines which of the comparators 211–218 will have its output serve as the ΔPIXEL FLAG signal. Of course, each of the comparators 211–218 is associated with a respective different threshold value from a respective one of the registers 221–228.

Figure 7:
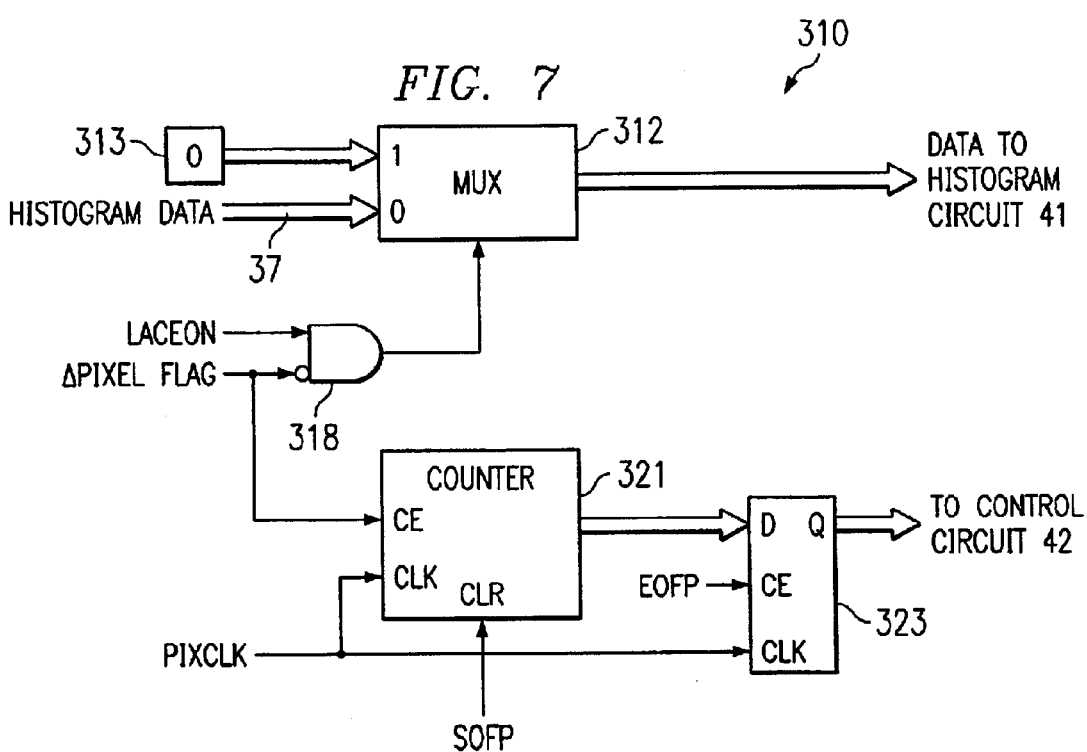
FIG. 7 is a block diagram of a circuit which can optionally be added to the circuit of FIG. 1 in order to provide capability for a local area contrast enhancement mode.

Referring again to FIG. 1, and as explained earlier, the video processing (VP) circuit 36 transmits histogram data on a path 37 to the historgram circuit 41. In a variation of the embodiment of FIG. 1, an additional circuit 310 can be provided between the VP circuit 36 and the histogram circuit 41, as indicated diagrammatically by broken lines in FIG. 1. FIG. 7 is a block diagram of the circuit 310.

In FIG. 7, the histogram data on path 37 is coupled to one input port of a multiplexer (MUX) circuit 312, the other input port of which is coupled to the outputs of a register 313. The register 313 is loaded by the control circuit 42 (FIG. 1). In the disclosed embodiment, the register 313 is loaded with a value of zero, but it could alternatively be loaded with some other value. The outputs of the MUX 312 serve as the outputs of the circuit 310, and thus carry the histogram data which is supplied to the histogram circuit 41 (FIG. 1). The select input of the MUX 312 is controlled by the output of a two-input AND gate 318. An active-low input of the gate 318 is coupled to the ΔPIXEL FLAG signal from the output of the comparator 57 in FIG. 1. The other input of the gate 318 is coupled to a LACEON signal, which is controlled by the control circuit 42. The term "LACE" is an acronym for "local area contrast enhancement". The LACEON signal is a logic high when a LACE mode is enabled, and a logic low when LACE mode is disabled.

A counter 321 has a count enable input coupled to the ΔPIXEL FLAG signal, a clock input coupled to the pixel clock signal PIXCLK, and a clear input controlled by the start of frame pulse signal SOFP. The outputs of the counter 321 are coupled to data inputs of a register 323. The register 323 has an enable input which is controlled by an end of frame pulse signal EOFP, which occurs at the end of each image or frame. The clock input of the register 323 is coupled to the pixel clock signal PIXCLK. The outputs of the register 323 can be read by software within the control circuit 42.

The circuit 310 operates as follows. If the LACE mode is off, then the LACEON signal is a logic low, the gate 318 is disabled, and the output of gate 318 causes the MUX 312 to supply the histogram data on path 37 to its outputs, and thus to the histogram circuit 41. As a result, the circuit 310 of FIG. 7 is effectively transparent when the LACE mode is off.

On the other hand, when the LACE mode is on, the signal LACEON is a logic high, and the gate 318 is enabled. Consequently, the inverse of the ΔPIXEL FLAG signal passes through the gate 318, and is used to control the MUX 312. As to those pixels of the current image for which the ΔPIXEL FLAG signal is a logic high, the MUX 312 passes histogram data from path 37 to its outputs and thus to the histogram circuit 41. In contrast, as to pixels in the current image for which the ΔPIXEL FLAG signal is a logic low, the MUX 312 supplies the value from register 313 to its outputs and thus to the histogram circuit 41. Consequently, since register 313 contains a value of zero in the disclosed embodiment, the histogram complied by the histogram circuit 41 is based solely on those pixels which have been flagged as having changed significantly in value, and all other pixels in the current image are completely ignored for purposes of developing the histogram. As a result, contrast is optimized on the basis of a local area of interest within the image, and not the entire image.

Turning now to the counter 321, the start of frame pulse SOFP signal clears the counter at the start of processing of each image or frame. Then, as the current frame or image is being processed, each pixel for which the ΔPIXEL FLAG signal is a logic high causes the counter 321 to be enabled, and thus incremented by the pixel clock signal PIXCLK. The counter 321 thus contains a count of the number of pixels in the current image which will be highlighted in the image displayed on the LCD 16. At the end of processing of the current image or frame, the end of frame pulse signal EOFP enables loading of the register 323, and the register 323 is loaded with the value from the counter, and then maintains this value throughout processing of the next successive image. The value in register 323 can be read by software in the control circuit 42, so that the software knows how many pixels are currently being highlighted in the image displayed on LCD 16.

Figure 8:
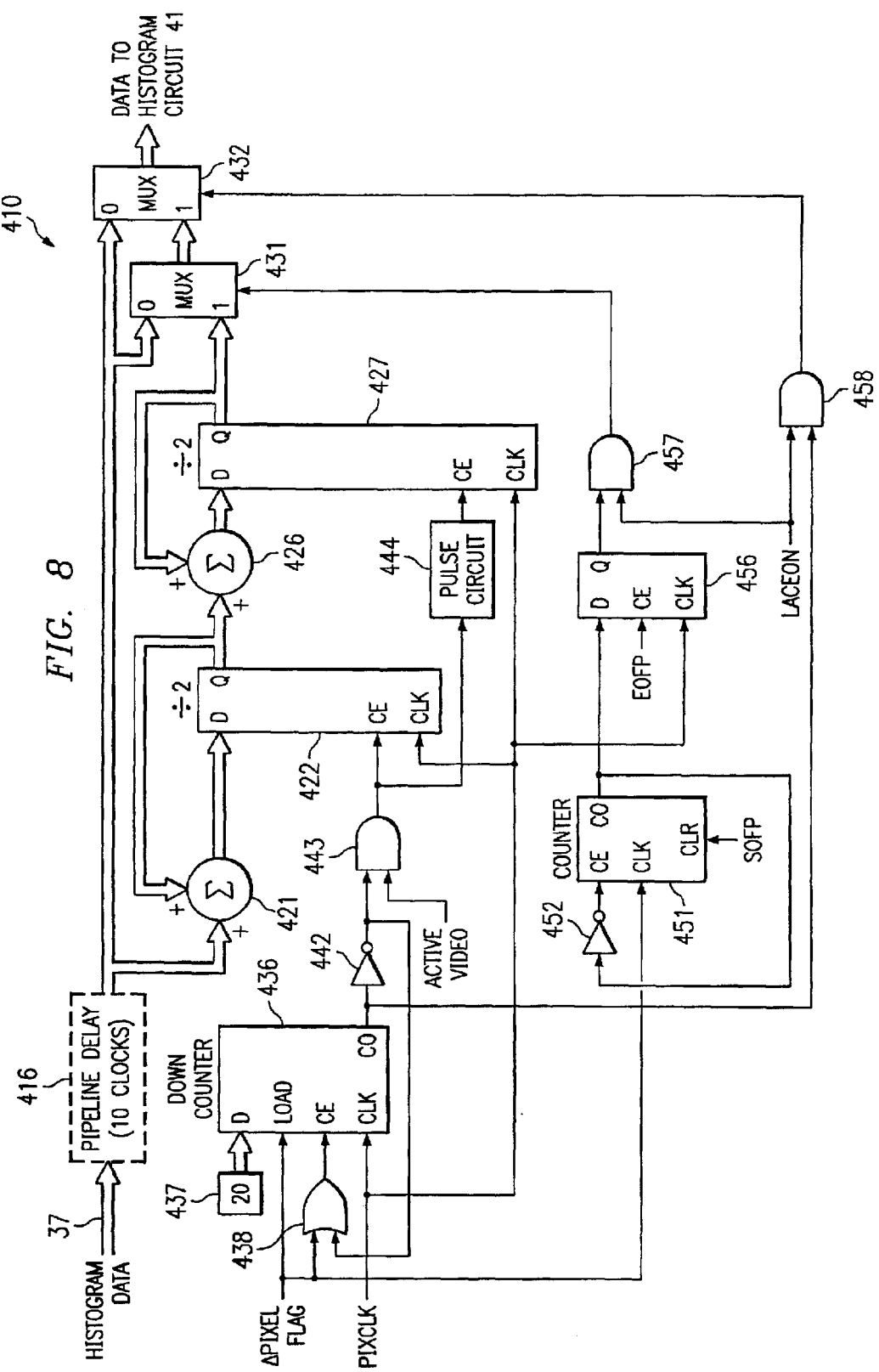
FIG. 8 is a block diagram of a circuit which is an alternative embodiment of the circuit of FIG. 7.

FIG. 8 is a block diagram of a circuit 410 which is an alternative embodiment of the circuit 310 of FIG. 7, and which provides a more sophisticated approach to implementation of the LACE mode. The circuit 410 includes a pipeline delay circuit 416, which delays the histogram data traveling along the path 37 by ten pulses of the pixel clock signal PIXCLK. Thus, histogram data corresponding to a given pixel will reach other components within circuit 410 at a point in time ten clock pulses later than the ΔPIXEL FLAG signal for that particular pixel. It will be recognized that the pipeline delay represented by circuit 416 could alternatively be generated by circuitry in some other part of the system, and thus the pipeline delay circuit 416 is shown in broken lines in FIG. 8.

A summation circuit 421 has a first input port which is coupled to outputs of the pipeline delay circuit 416. A register 422 has data inputs which are coupled to outputs of the summation circuit 421, other than the least significant bit from summation circuit 421. Thus, the value applied to the inputs of the register 422 is effectively half the value computed by the circuit 421.

The data outputs of the register 422 are coupled to a second input port of the summation circuit 421, and to a first input port of a further summation circuit 426. A further register 427 has data inputs coupled to the outputs of the summation circuit 426, other than the least significant bit thereof. Consequently, each value supplied to the inputs of register 427 is effectively half the value computed by the summation circuit 426. The data outputs of the register 427 are coupled to a second input port of the summation circuit 426, and to one input port of a multiplexer (MUX) 431. The other input port of MUX 431 is coupled to the output of the pipeline delay circuit 416. The outputs of the multiplexer 431 are coupled to one input port of a further multiplexer (MUX) 432. The other input port of MUX 432 is coupled to the outputs of the pipeline delay circuit 416. The outputs of the MUX 432 serve as the outputs of circuit 410, and thus carry the data supplied to the histogram circuit 41.

A down counter 436 has data inputs which are coupled to the outputs of a register 437. The register 437 is loaded by the control circuit 42 (FIG. 1), and contains a constant value which is in the disclosed embodiment is 20. A two-input OR gate 438 has its output coupled to a count enable input of the counter 436. The ΔPIXEL FLAG signal from the output of comparator 57 (FIG. 1) is coupled to a load input of the counter 436, and also to one input of the gate 438. The counter 436 is clocked by the pixel clock signal PIXCLK.

A carry output of the counter 436 is coupled through an inverter 442 to the other input of the gate 438, and to one input of a two-input AND gate 443. The other input of the gate 443 is coupled to an ACTIVE VIDEO signal, which is a logic high during the entire period of time that the system is processing all of the pixels of a given image or frame. The output of the gate 433 is coupled to an enable input of the register 422, and a clock input of the register 422 is coupled to the pixel clock signal PIXCLK.

The output of the gate 443 is also coupled to a pulse circuit 444, which is a monostable multivibrator or "one-shot", and which produces a pulse of predetermined duration in response to each falling edge of the signal at the output of the gate 443. The pulse produced by pulse circuit 444 has a duration which is equal to the period of the pixel clock signal PIXCLK. The output of the pulse circuit 444 is coupled to an enable input of the register 427, and the clock input of the register 427 is coupled to the pixel clock signal PIXCLK.

A counter 451 has a clock input coupled to the ΔPIXEL FLAG signal from the output of the comparator 57 (FIG. 1). The counter 451 has a clear input controlled by the start of frame pulse signal SOFP, which occurs at the beginning of each frame or image. The counter has a carry output which is coupled through an inverter 452 to the count enable input of the counter 451. The carry output of the counter 451 is also coupled to the "D" input of a D-type flip flop 456, the clock input of which is coupled to the pixel clock signal PIXCLK. The flip flop 456 has an enable input coupled to the end of frame pulse signal EOFP, which occurs at the end of each frame of data.

The data output of the flip flop 456 is coupled to one input of a two-input AND gate 457, the output of which is coupled to a control input of the MUX 431. A further two-input AND gate 458 has one input coupled to the carry output of counter 436, and has an output coupled to the control input of the MUX 432. The gates 457 and 458 each have one input coupled to the LACEON signal. As discussed above, the LACEON signal is a logic high when the LACE mode is enabled, and is a logic low when the LACE mode is disabled. The LACEON signal is controlled by the control circuit 42.

When the LACE mode is disabled, the LACEON signal is a logic low, the gates 457 and 458 are both disabled, and the MUX 432 supplies all of the histogram data received from path 37 through pipeline delay circuit 416 to its outputs, and thus to the histogram circuit 41. While this data is subject to a pipeline delay, the histogram circuit is configured to accommodate this pipeline delay. The histogram circuit 41 thus effectively gets the same histogram data that it would get if the circuit 410 was not present.

In contrast, when the LACE mode is on, the LACEON signal is a logic high, and the gates 457 and 458 are both enabled. When the ΔPIXEL FLAG signal is a logic high for a given pixel, the counter 436 is loaded with a value of 20 from the register 437. As soon as the counter 436 is loaded from the register 437, its carry out is deactivated. Thus, through the inverter 442 and the gate 438, a logic high signal is applied to the count enable input of counter 436, so that the counter 436 counts down. When the counter 436 reaches zero, it generates a logic high signal at its carry output, which through the inverter 442 and gate 438 disable its count enable input, so that the counter 436 stops counting. If the ΔPIXEL FLAG signal is a logic high for several successive pixels, the counter 436 will be repeatedly re-loaded with a value of 20 until the ΔPIXEL FLAG signal changes to a logic low, and will then begin counting down.

The carry output of the counter 436 and thus the output of gate 458 will each be a logic low while the counter is counting down, and will each be a logic high when the counter contains a value of zero. The circuit 410 will thus utilize the histogram data received on path 37 through the circuit 416 while the counter 436 is counting down. Since the circuit 416 implements a pipeline delay corresponding to ten clock pulses, and since the counter 436 is loaded with a value of 20, the circuit 410 will utilize this histogram data for the ten pixels which immediately precede the pixel that caused the counter 436 to be loaded, as well as the ten pixels which immediately follow that pixel. If the ΔPIXEL FLAG signal is a logic high for several successive pixels, the circuit 410 will utilize the histogram data for these pixels, as well as that for the ten pixels which immediately precede the first of these pixels, and the ten pixels which immediately follow the last of these pixels.

As discussed above, the ACTIVE VIDEO signal is a logic high throughout the time when circuit 410 is processing video data for the current image or frame. Thus, the gate 443 will be enabled throughout this time period, and will use the output of inverter 442 to control the enable input of the register 422. Therefore, while the counter 436 is counting down, the register 422 will be loaded on each successive pulse of the pixel clock signal PIXCLK. Consequently, for each pixel, the incoming histogram data is added by the summation circuit 421 to a value from the register 422 which is half the prior total calculated by the summation circuit 421, and then a value equal to half the new total is loaded into the register 422. The summation circuit 421 and register 422 thus serve as a form of rough averaging circuit which, over a number of pixels, will tend to provide an approximate average of the incoming values of the histogram data.

The signal at the output of the gate 443 experiences a falling edge each time the counter 436 reaches zero, and this causes the pulse circuit 444 to produce a short pulse which enables a load of the register 427. The summation circuit 426 and the register 427 serve as a rough averaging circuit in a manner similar to the summation circuit 421 and register 422, and thus serve to provide a rough average of the average value computed by the circuit 421 and register 422 for each group of 20 or more pixels delineated by the counter 436.

Since the counter 451 is cleared at the start of the current image or frame by the start of frame pulse SOFP, and is clocked each time the ΔPIXEL FLAG signal is a logic high, it counts the number of pixels which will be highlighted in the image display on LCD 16. When the counter 451 reaches a specified value, which in the disclosed embodiment is, a value selected from a range of about 2 to 32, the counter 451 produces at its carry output a logic high which, through inverter 452, disables its count enable input so that the counter 451 stops counting. At the end of each image or frame, the flip flop 456 is enabled by the end of frame pulse signal EOFP, and is loaded with a binary "0" or a binary "1", depending on the state of the carry output of the counter 451. Thus, throughout processing of the next frame or image, the flip flop 456 will contain an indication of whether or not the counter 451 reached its maximum count value during the prior image or frame.

The value in flip flop 456 is supplied through gate 457 to the MUX 431. If the output of flip flop 456 is a logic high, indicating that the counter 451 reached its maximum value, the MUX 431 supplies the output of register 427 to the inputs of MUX 432. Otherwise, MUX 431 supplies the histogram data received from path 37 through the pipeline delay circuit 416 to the inputs of the MUX 432.

During the time that the counter 436 contains a non-zero value and is counting down, the carry output counter 436 is a logic low, and passes through the gate 458 to control the MUX 432. Thus, while a group of 20 or more pixels delineated by the counter 436 is being processed, the MUX 432 supplies to the histogram circuit 41 the histogram data received on path 37 through the pipeline delay circuit 416. Otherwise, when the counter 436 contains a value of zero, the MUX 432 supplies to the histogram circuit 41 either histogram data from the circuit 416 or average histogram data from the register 427, depending on whether or not the counter 451 reached its maximum value during processing of the preceding image or frame. Consequently, when the LACE mode is enabled, the circuit 410 gives greater weight to the histogram data associated with pixels that are in the region of the pixels which are to be highlighted on the LCD 16. Consequently, contrast is optimized based on conditions local to the area of the highlighted pixels, and not based on the entire image.

The present invention provides a number of technical advantages. Once such advantage is that movement within a scene under observation is detected and highlighted in a manner which visually flags the motion for an observer or operator. A related advantage is that the moving object itself is highlighted, rather than just a general region in which movement was detected. Still another advantage is that the disclosed approach can be implemented with little or no added hardware, and in particular without the addition of multiple processors, large amounts of memory, and/or large and complex software algorithms. In this regard, some existing systems include integrated circuits such as programmable gate arrays, in which a portion of the circuitry is unused, and the unused circuitry can be configured to serve as the circuitry needed to implement the invention, such that no additional physical components are added to the existing system. The disclosed approach can thus be implemented with minimal added cost, power, space and weight, which facilitates its use even in portable systems. Further this makes it feasible to retrofit the invention into many pre-existing systems. Yet another advantage is that the ultimate determination of whether there has been movement is made by the observer, rather than by hardware or software, which effectively avoids false alarms.

A further advantage results from use of the option in which an audible sound is generated in response to detection of movement within the scene. Yet another advantage results from the capability to effect automatic and adaptive adjustment of a threshold which determines the sensitivity for detection of movement. Still a different advantage results where a local area contrast enhancement mode is used in order to calculate histogram information in a manner giving greater weight to data associated with pixels in the region of detected movement, such that contrast is optimized primarily with respect to the area of interest, and not the entire image.

Although selected embodiments have been illustrated and described in detail, it will be understood that various substitutions and alterations are possible without departing from the spirit and scope of the present invention, as defined by the following claims.

What is claimed is:

1. An apparatus, comprising:
    a detector responsive to radiation from a scene for producing successive images of the scene, each said image including a plurality of pixels which each have a respective pixel value representative of a level of radiation corresponding to that pixel;
    a section responsive to said images from said detector for assigning each said pixel in each said image to one of a first class and a second class when that pixel respectively meets and fails to meet a criteria, said criteria being met when the current pixel value for the pixel differs by at least a threshold amount from a history value which is a function of the pixel value of that pixel in at least one prior said image, said section converting each said image to an adjusted image by effecting an adjustment to the pixel values of the pixels in a selected one of said first and second classes; and
    a display which sequentially displays said adjusted images.

2. An apparatus according to claim 1, wherein said section effects said adjustment by effecting one of an increase and a decrease to the pixel values of each of the pixels assigned to said selected one of said first and second classes.

3. An apparatus according to claim 1, wherein said detector detects infrared radiation from the scene.

4. An apparatus according to claim 1, wherein said section is responsive to each said image received from said detector for combining each said history value with the corresponding pixel value from that image using a weighting function, and saving the results for subsequent use as the history values with the next said image.

5. An apparatus according to claim 1, wherein said threshold amount is a predetermined constant value.

6. An apparatus according to claim 1, wherein said section includes a portion which facilitates manual variation of said threshold amount.

7. An apparatus according to claim 1, wherein said section includes a portion for effecting dynamic variation of said threshold amount as a function of said images received from said detector.

8. An apparatus according to claim 1, wherein said section includes a portion which can produce an audible sound as a function of the pixels assigned to one of said first and second classes.

9. An apparatus according to claim 8, wherein said portion produces said audible sound when the number of the pixels assigned to one of said first and second classes is in excess of a threshold value.

10. An apparatus according to claim 1, wherein said section includes:
    a difference circuit for determining a difference between a selected said pixel value and the corresponding history value;
    a comparison circuit for comparing said difference to said threshold value to obtain a comparison value;
    an adjustment circuit responsive to said selected pixel value for effecting said adjustment thereto in order to obtain an adjusted pixel value; and
    a multiplexer having two inputs respectively responsive to said selected pixel value and said adjusted pixel value, said multiplexer having an output, and said multiplexer coupling a selected one of said inputs thereof to said output thereof as a function of said comparison value, said display being responsive to said output of said multiplexer.

11. An apparatus according to claim 1, wherein said section includes a portion responsive to said images received from said detector for evaluating whether said detector is moving relative to the scene, and for disabling said conversion of said images into said adjusted images when said detector is determined to be moving relative to the scene.

12. An apparatus according to claim 11, wherein when effecting said evaluation of whether said detector is moving relative to the scene, said portion determines for each of a plurality of sectors in one of said images whether the number of pixels in the sector exceeds a respective predetermined value, and effects said disabling of said conversion if the number of sectors for which the predetermined value is exceeded is in excess of a specified number.

13. An apparatus according to claim 12, wherein said predetermined values for sectors corresponding to an upper portion of the image are lower than said predetermined values for sectors corresponding to a lower portion of the image.

14. An apparatus according to claim 1, wherein said section includes a portion responsive to said images from said detector for generating data which is used to prepare a histogram, said portion effecting the generation of said data in a manner giving greater weight to data associated with pixels in the region of the pixels assigned to one of said first and second classes.

15. A method, comprising the steps of:
responding to radiation from a scene by producing successive images of the scene, each said image including a plurality of pixels which each have a respective pixel value representative of a level of radiation corresponding to that pixel;
assigning each said pixel in each said image to one of a first class and a second class when that pixel respectively meets and fails to meet a criteria, said criteria being met when the current pixel value for the pixel differs by at least a threshold amount from a history value which is a function of the pixel value of that pixel in at least one prior said image;
converting each said image to an adjusted image by effecting an adjustment to the pixel values of the pixels in a selected one of said first and second classes; and
sequentially displaying said adjusted images.

16. A method according to claim 15, including the step of effecting said adjustment by effecting one of an increase and a decrease to the pixel values of each of the pixels assigned to said selected one of said first and second classes.

17. A method according to claim 15, including the step of carrying out said production of said images in response to radiation from the scene which is infrared radiation.

18. A method according to claim 15, including the step of responding to each said image received from said detector by combining each said history value with the corresponding pixel value from that image using a weighting function, and saving the results for subsequent use as the history values with the next said image.

19. A method according to claim 15, including the step of selecting a predetermined constant value to serve as said threshold amount.

20. A method according to claim 15, including the step of effecting variation of said threshold amount in response to a manual input.

21. A method according to claim 15, including the step of effecting dynamic variation of said threshold amount as a function of said images received from said detector.

22. A method according to claim 15, including the step of producing an audible sound as a function of the pixels assigned to one of said first and second classes.

23. A method according to claim 22, wherein said step of producing said audible sound includes the step of producing said audible sound when the number of the pixels assigned to one of said first and second classes is in excess of a threshold value.

24. A method according to claim 15, including the step of generating data which is used to prepare a histogram, in a manner giving greater weight to data associated with pixels in the region of the pixels assigned to one of said first and second classes.

* * * * *